(12) United States Patent
Smentek et al.

(10) Patent No.: US 9,460,013 B2
(45) Date of Patent: Oct. 4, 2016

(54) METHOD AND SYSTEM FOR REMOVAL OF A CACHE AGENT

(71) Applicant: Oracle International Corporation, Redwood Shores, CA (US)

(72) Inventors: David Richard Smentek, Cupertino, CA (US); Ali Vahidsafa, Palo Alto, CA (US); Venkatram Krishnaswamy, Los Altos, CA (US); Thirumalai Swamy Suresh, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 14/479,191

(22) Filed: Sep. 5, 2014

(65) Prior Publication Data

US 2016/0070646 A1    Mar. 10, 2016

(51) Int. Cl.
*G06F 12/08* (2016.01)

(52) U.S. Cl.
CPC ....... *G06F 12/0833* (2013.01); *G06F 2212/62* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 6,553,409 B1* | 4/2003 | Zhang | ............... | G06F 12/0815 709/213 |
| 8,701,145 B1* | 4/2014 | Berger | ............... | H04N 21/4147 725/32 |
| 8,923,683 B1* | 12/2014 | Berger | ............... | 386/248 |
| 8,929,717 B1* | 1/2015 | Berger | ............... | 386/248 |
| 2002/0166031 A1* | 11/2002 | Chen | ............... | G06F 12/0813 711/141 |
| 2003/0018714 A1* | 1/2003 | Mikhailov | ....... | G06F 17/30861 709/203 |
| 2006/0177015 A1* | 8/2006 | Skakkebaek | ........ | H04L 12/58 379/67.1 |
| 2008/0189358 A1* | 8/2008 | Charles | ............... | G06F 9/4443 709/203 |
| 2012/0042130 A1* | 2/2012 | Peapell | ............... | G06F 12/0866 711/126 |
| 2014/0355955 A1* | 12/2014 | Berger | ............... | G06Q 30/00 386/248 |

* cited by examiner

*Primary Examiner* — Charles Rones
*Assistant Examiner* — Matthew Chrzanowski
(74) *Attorney, Agent, or Firm* — Osha Liang LLP (57) ABSTRACT

A method for removal of an offlining cache agent, including: initiating an offlining of the offlining cache agent from communicating with a plurality of participating cache agents while a first transaction is in progress; setting, based on initiating the offlining, an ignore response indicator corresponding to the offlining cache agent on each of the plurality of participating cache agents; offlining, based on setting the ignore response indicator, the offlining cache agent; and ignoring, based on setting the ignore response indicator, a first response to the transaction from the offlining cache agent.

20 Claims, 9 Drawing Sheets

METHOD AND SYSTEM FOR REMOVAL OF A CACHE AGENT

BACKGROUND

In a multiprocessor and/or multicore shared memory system, each processor and/or processing core may have a separate cache or set of caches that connect to the same shared memory. Processors and processing cores may each update the processor's or processing core's respective local cache. Cache coherence or cache coherency refers to the consistency of data stored in local caches based on the updates to the local caches.

SUMMARY

In general, in one aspect, the invention relates to a method for removal of an offlining cache agent. The method comprises: initiating an offlining of the offlining cache agent from communicating with a plurality of participating cache agents while a first transaction is in progress; setting, based on initiating the offlining, an ignore response indicator corresponding to the offlining cache agent on each of the plurality of participating cache agents; offlining, based on setting the ignore response indicator, the offlining cache agent; and ignoring, based on setting the ignore response indicator, a first response to the transaction from the offlining cache agent.

In general, in one aspect, the invention relates to a non-transitory computer-readable storage medium storing a plurality of instructions for removal of an offlining cache agent. The plurality of instructions comprise functionality to: initiate an offlining of the offlining cache agent from communicating with a plurality of participating cache agents while a first transaction is in progress; set, based on initiating the offlining, an ignore response indicator corresponding to the offlining cache agent on each of the plurality of participating cache agents; offline, based on setting the ignore response indicator, the offlining cache agent; and ignore, based on propagating setting the ignore response indicator, a first response to the transaction from the offlining cache agent.

In general, in one aspect, the invention relates to a system. The system comprises: a plurality of cache for storing a plurality of cache lines, and a plurality of cache agents comprising a plurality of participating cache agents and an offlining cache agent, wherein each cache of the plurality of cache corresponds to one of the plurality of cache agents, and wherein the plurality of cache agents are configured to: initiate an offlining of the offlining cache agent from communicating with a plurality of participating cache agents while a first transaction is in progress, wherein the first transaction is for a cache line of the plurality of cache lines, set, based on initiating the offlining, an ignore response indicator corresponding to the offlining cache agent on each of the plurality of participating cache agents, offline, based on setting the ignore response indicator, the offlining cache agent, and ignore, based on setting the ignore response indicator, a first response to the transaction from the offlining cache agent.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for removal of a cache agent from a system. As used herein, the cache agent being removed is referred to as an offlining cache agent. Specifically, embodiments of the invention relate to removal of the offlining cache agent while transactions between the offlining cache agent and participating cache agents in the system are in progress. In one or more embodiments of the invention, the system complies with a coherency protocol that directs each participating cache agent and potentially the offlining cache agent to respond to any request sent by a requesting cache agent for data. Embodiments of the invention further related to responding to or ignoring a request from any requesting cache agent while the offlining cache agent is being removed without disrupting the cache coherency between the caches corresponding to the remaining participating cache agents.

Figure 1:
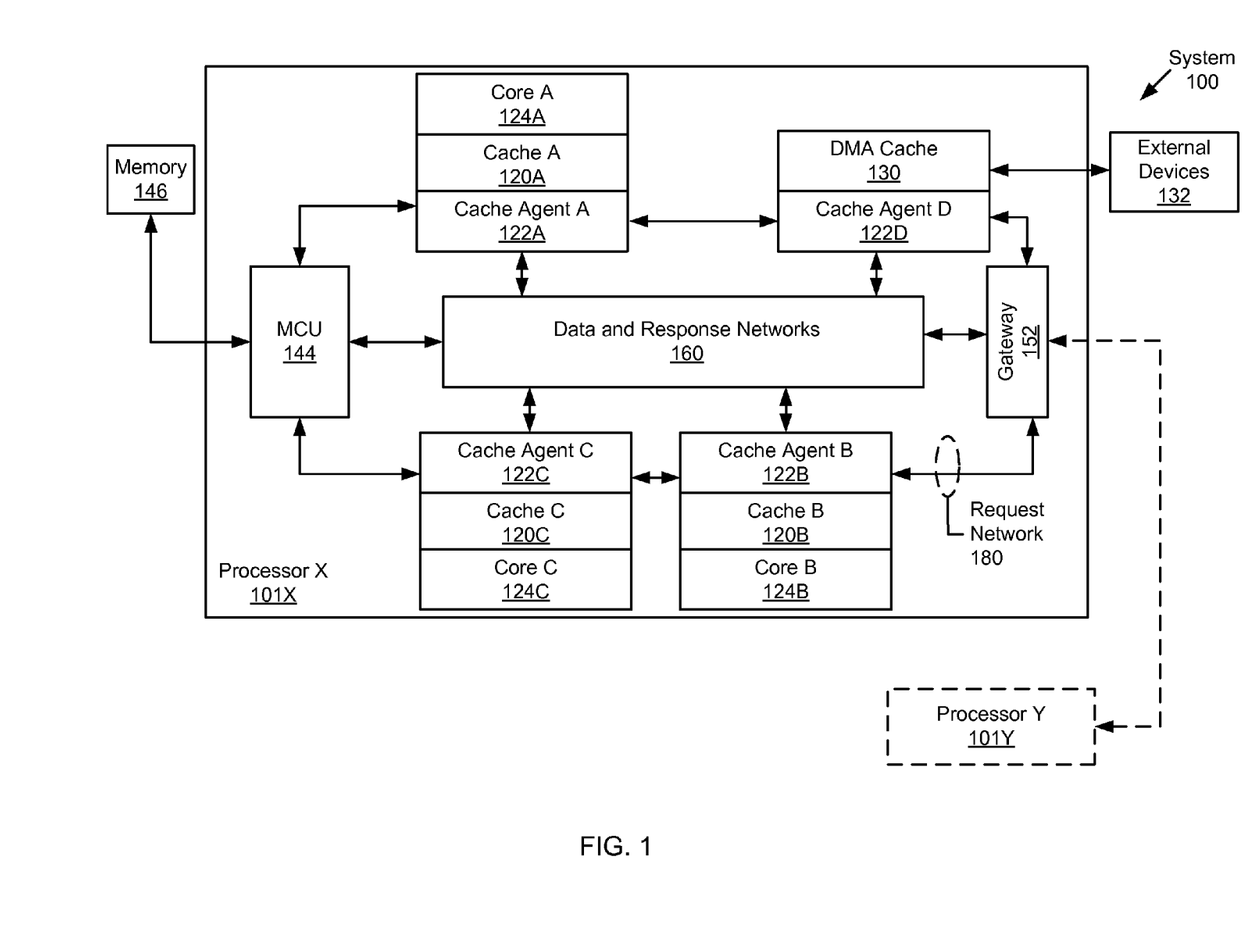
FIGS. 1 and 2 show schematic diagrams of a system in accordance with one or more embodiments of the invention.

FIG. 1 shows a system (100) in accordance with one or more embodiments of the invention. As shown in FIG. 1, the system (100) includes processor X (101X) and optionally processor Y (101Y). In one or more embodiments of the invention, a processor (e.g., processor X (101X), processor Y (101Y)) may be an integrated circuit for processing instructions. For example, the processor may be one or more cores, or micro-cores of a processor. In the case of multiple processors (e.g., processor X (101X), processor Y (101Y)), the multiple processors may be located or embedded on the same chip or on different chips. Processor X (101X) includes one or more cores that are each operatively connected to one or more caches. For example, processor X (101X) includes core A (124A) operatively connected to cache A (120A), core B (124B) operatively connected to cache B (120B), and core C (124C) operatively connected to cache C (120C). Although FIG. 1 shows three cores and caches, the processor may include more or fewer cores and caches without departing from the scope of the invention. Processor X (101X) may also includes a gateway (152) operatively connected to the gateways of other processors (e.g., processor Y (101Y)). Processor Y (101Y) may include similar types of components (not shown).

In one or more embodiments of the invention, processor X (101X) includes a Direct Memory Access (DMA) cache (130) operatively connected to one or more external devices (132) and a memory controller unit (MCU) (144). In one or more embodiments of the invention, the DMA cache (130) stores contents of memory addresses from the one or more external devices (132). In one or more embodiments of the invention, external devices (132) (e.g., a printer, external storage, flash memory stick) are connected to, but are not a part of processor X (101X) (i.e., off-processor). In other words, a device is external when the device is not a part of the processor. For example, the external device may be on a different chip. In one or more embodiments of the invention, the MCU (144) is hardware and/or software that include functionality to communicate with off-processor memory (146). Processor Y (101Y) may also include a DMA cache (not shown) and an MCU (not shown).

In one or more embodiments of the invention, cores (e.g., core A (124A), core B (124B), core C (124C)) are hardware central processing units that read and execute program instructions. In order to execute instructions, the cores (124A-124C) and/or external devices (132) access (e.g., read from and/or write to) one or more memory addresses in memory (146). In one or more embodiments of the invention, memory (146) may correspond to random access memory (RAM), dynamic random access memory (DRAM), or any physical memory.

In one or more embodiments of the invention, the contents of some memory addresses may be locally stored in one or more caches (e.g., cache A (120A), cache B (120B), cache C (120C), DMA cache (130)), which have faster access times than memory (146). Said another way, a cache is a portion of memory (e.g., RAM) that a core may access more quickly than memory (146) in accordance with one or more embodiments of the invention. If a cache (120A-120C, 130) is not storing the contents of a required memory address, a cache miss occurs.

In one or more embodiments of the invention, processor X (101X) includes one or more cache agents (e.g., cache agent A (122A), cache agent B (122B), cache agent C (122C), cache agent D (122D))) operatively connected to the caches (120A-120C, 130). For example, processor X (101X) includes cache agent A (122A) operatively connected to cache A (120A), cache agent B (122B) operatively connected to cache B (120B), cache agent C (122C) operatively connected to cache C (120C), and cache agent D (122D) operatively connected to DMA cache (130). Similarly, processor Y (101Y) may include cache agents that are operatively connected to caches (not shown).

In one or more embodiments of the invention, a cache agent (e.g., cache agent A (122A), cache agent B (122B), cache agent C (122C), and cache agent D (122D)) is software and/or hardware associated with a core or any cache controller that has ownership of a cache. Each cache agent may have a corresponding one or more caches that do not correspond to any other cache agent. For example, as shown in FIG. 1, cache agent A (122A) is associated with core A (124A), cache agent B (122B) is associated with core B (124B); cache agent C (122C) is associated with core C (124C), and cache agent D (122D) is associated with a DMA controller (not shown). In one or more embodiments of the invention, a cache agent (122A-122B) includes functionality to broadcast a request for data (e.g., cache line) to other cache agents and receive a response and potentially the requested data from the other cache agents. In one or more embodiments of the invention, a response may either be a negative acknowledgment (Nack) if the cache line is not present or a positive acknowledgment if the cache line is present. The cache agents include further functionality to send responses upon receiving a request for data. In one or more embodiments of the invention, sending a request and receiving a response is referred to as a transaction.

Still referring to FIG. 1, on processor X (101X), the MCU (144), and the one or more cache agents are operatively connected by a request network (180). In one or more embodiments of the invention, request network (180) is a set of wired or wireless communication channels that include functionality to transmit requests and forward requests from a cache agent to any cache agents using network commands. One possible implementation for the request network (180) is one or more rings. Accordingly, a request propagates around the one or more rings to each cache agent. Alternatively or additionally, the request network (180) may be implemented using physical wires to form the one or more rings between the cache agents rather than using network commands.

In one or more embodiments of the invention, the cache agents (e.g., 122A-122D) may be part of a system that complies with a protocol (e.g., snoopy-based protocol). In one or more embodiments of the invention, the protocol directs the system to keep contents of memory addresses consistent across cache agents that comply with the protocol to establish coherency. More specifically, in one or more embodiments of the invention, a snoopy-based protocol directs each cache agent complying with the protocol to respond to any request sent by a requesting cache agent. In one or more embodiments of the invention, a requesting cache agent is a cache agent that generates a request to the remaining cache agents.

In one or more embodiments of the invention, processor X (101X) includes data and response networks (160) for transmitting responses to requests and the data associated with some responses. In one or more embodiments of the invention, at least one network in the data and response networks (160) is a point-to-point network. In one or more embodiments of the invention, in a point-to-point network, each cache agent includes a direct connection to each other cache agents. For example, cache agent A has a direct connection to every other cache agent in the request network (180). Although the data and response networks (160) are logically separate from the request network (180), transmission of responses and data may be executed over the same physical network or physical wires as the requests.

Although FIG. 1 shows one processor (i.e., Processor X (101X)) and an optional second processor (i.e., Processor Y (101Y)), the system (100) may have any number of processors. Further, although processor X (101X) only shows three caches (i.e., Cache A (120A), Cache B (120B), Cache C (120C)), each processor may have any number of caches. Further still, although FIG. 1 shows only one core operatively connected to each cache, there may be any number of cores attached to each cache. Moreover, different caches may be attached to different numbers of cores.

Further, although FIG. 1 only shows one gateway on processor X (101X), in one or more embodiments of the invention, a single processor has multiple gateways. In such embodiments, each gateway of the multiple gateways on the processor is responsible for a portion of the cache lines. In other words, requests associated with a given cache line are only handled by one predetermined gateway of the multiple gateways on the processor.

Finally, although FIG. 1 shows caches (122A-122C, 130), in one or more embodiments of the invention, a cache hierarchy exists where contents of memory addresses from memory (146) are stored first in one or more L3 caches then one or more L2 caches followed by one or more L1 caches (not shown).

While FIG. 1 shows a configuration of components, other configurations may be used without departing from the scope of the invention. For example, various components may be combined to create a single component. As another example, the functionality performed by a single component may be performed by two or more components. By way of a more concrete example, the cache agent may be the corresponding core or may be instructions that execute on the corresponding core of the system. In such a scenario, the cache agent and core may be combined into a single component.

Figure 2:
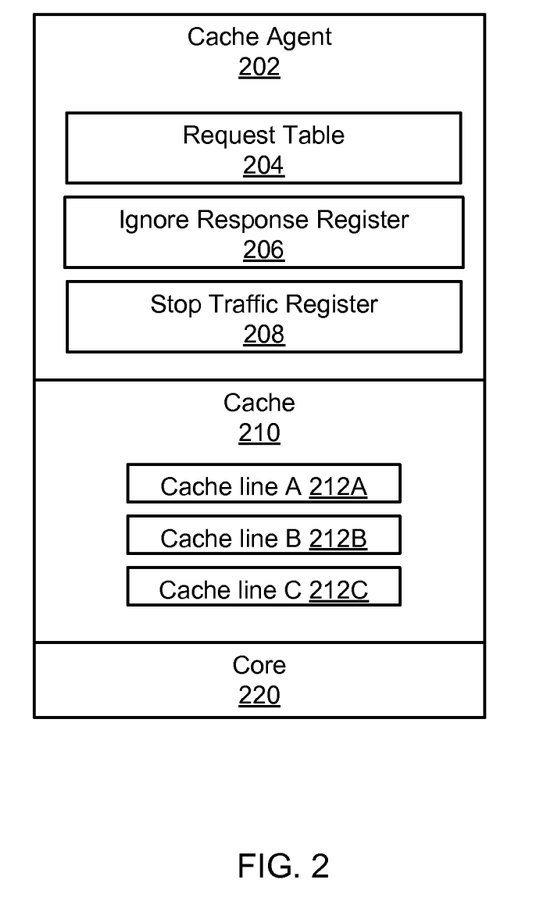

FIG. 2 shows a cache agent, a cache, and a core in accordance with one or more embodiments of the invention. The cache agent (202) may be the same or similar to any of the cache agents (122A-122D) discussed above in reference to FIG. 1. The cache (210) may be the same or similar to any of the caches (120A-120C, 130) discussed above in reference to FIG. 1. Further, the core (220) may be the same or similar to any of the cores (124A-124C) discussed above in reference to FIG. 1.

In one or more embodiments of the invention, the cache agent (202) includes a request table (204), an ignore response register (206) and a stop traffic register (208). In one or more embodiments of the invention, the request table (204) is any data structure (e.g., hash table, array, linked list, etc.) that stores any requests that the cache agent (202) is directed to send to other cache agents to comply with the protocol. A request may be removed from the request table (204) once all responses to the request from the other cache agents are sent to the cache agent (202).

In one or more embodiments of the invention, the ignore response register (206) includes an ignore response indicator for each cache agent including the cache agent (202). Each ignore response indicator defines whether responses from a cache agent should be ignored (i.e., not process the positive or negative acknowledgement).

In one or more embodiments of the invention, the ignore response indicator is an ignore response bit. For example, the ignore response bit may be set to 0 to represent "do not ignore responses from the cache agent corresponding to the ignore response bit" and set to 1 to represent "ignore responses from the cache agent corresponding to the ignore response bit". For example, consider the scenario in which four cache agents in the system exist. In this example, the ignore response register includes 0000. Since the ignore response bits are all set to zero, none of the cache agents should be ignored. As another example, suppose there are three cache agents in the system. The ignore response register may be 010. Cache agent 0 should not be ignored since the ignore response bit corresponding to cache agent 0 is set to 0, cache agent 1 should be ignored since the ignore response bit corresponding to cache agent 1 is set to 1, and cache agent 2 should not be ignored since the ignore response bit corresponding to cache agent 2 is set to 0. In one or more embodiments of the invention, each cache agent stores a local copy of the ignore response register.

The above is only an example. Other values to represent that whether a response should be ignored may be used without departing from the invention. Further, rather than using a bit string to represent whether to ignore response, the ignore response register may use another data structure to represent whether to ignore the response.

In one or more embodiments of the invention, the stop traffic register (208) includes a stop traffic indicator corresponding to the cache agent (202). In one or more embodiments of the invention, the stop traffic indicator indicates whether the local cache agent should receive requests and transmit responses.

In one or more embodiments of the invention, the stop traffic indicator is a stop traffic bit. For example, if the stop traffic bit is set to 0, any requests may be received by the cache agent (202) and the cache agent generates a response as a result. In contrast, if the stop traffic bit is set to 1, any requests are not received by the cache agent (202) thereby idling the interface of the cache agent. For example, consider the scenario in which cache agent 1 has a stop traffic bit set to 1. Cache agent 0 then sends a request to cache agent 1. Since the stop traffic bit of cache agent 1 is set to 1, the request is prevented from reaching cache agent 1 (e.g., not received). Therefore, no response from cache agent 1 is generated.

The above is only an example. Other values to represent that a request should not be processed may be used without departing from the invention. Further, rather than using a bit to represent whether to stop traffic, the stop traffic register may use another data structure to represent whether to stop traffic.

In one or more embodiments of the invention, the cache (210) includes functionality to store one or more cache lines (e.g., cache line A (212A), cache line B (212B), cache line C (212C)). In one or more embodiments of the invention, a cache line (212A-212C) is the smallest unit of memory that may be copied from memory to a cache. Said another way, a cache line (212A-212C) is stored in an entry in a cache and corresponds to a copy of data located at one or more memory addresses in memory. Further, a cache line (212A-212C) may also be held by another cache in the system.

Figure 3:
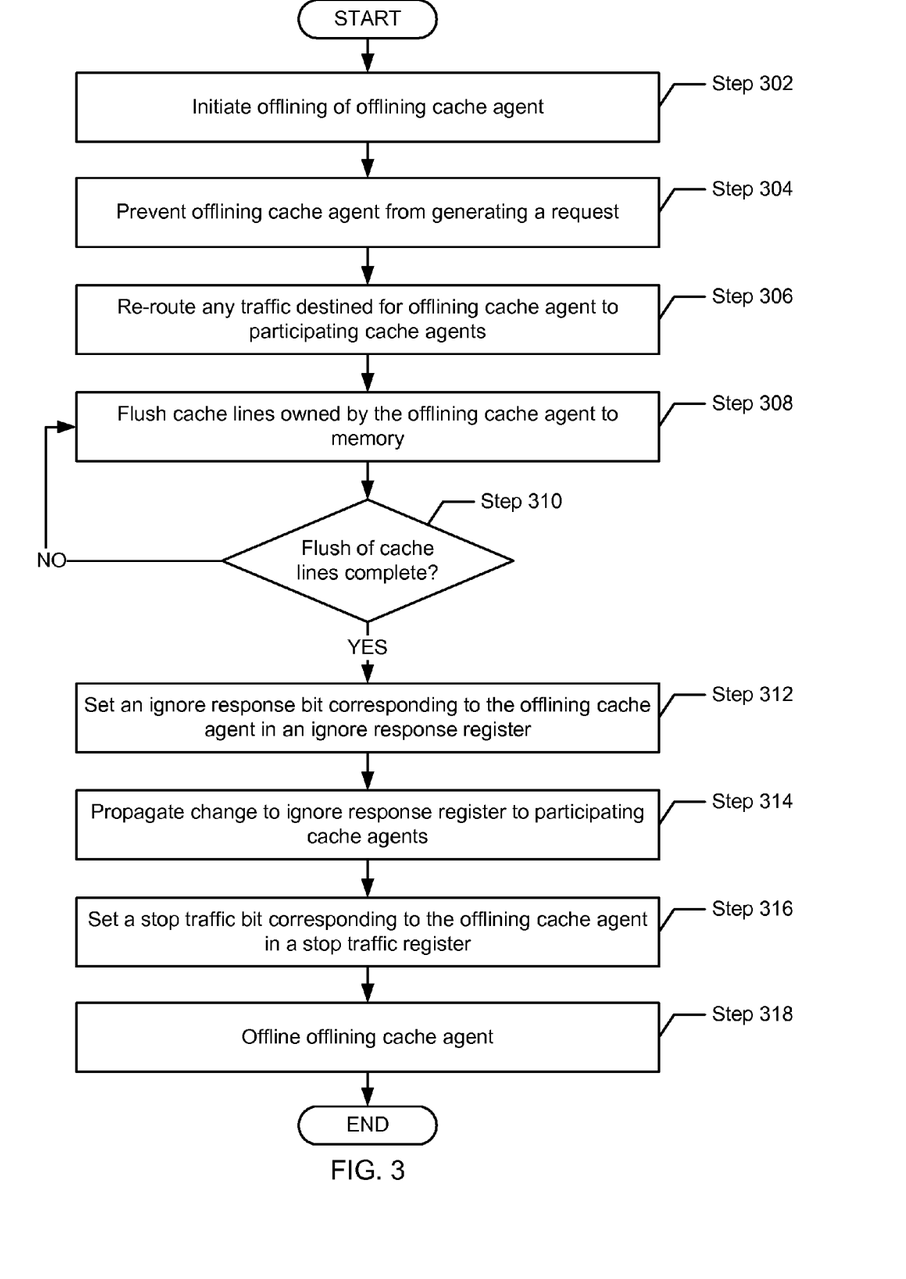
FIGS. 3, 4, 5A, and 5B show flowcharts in accordance with one or more embodiments of the invention.
Figure 4:
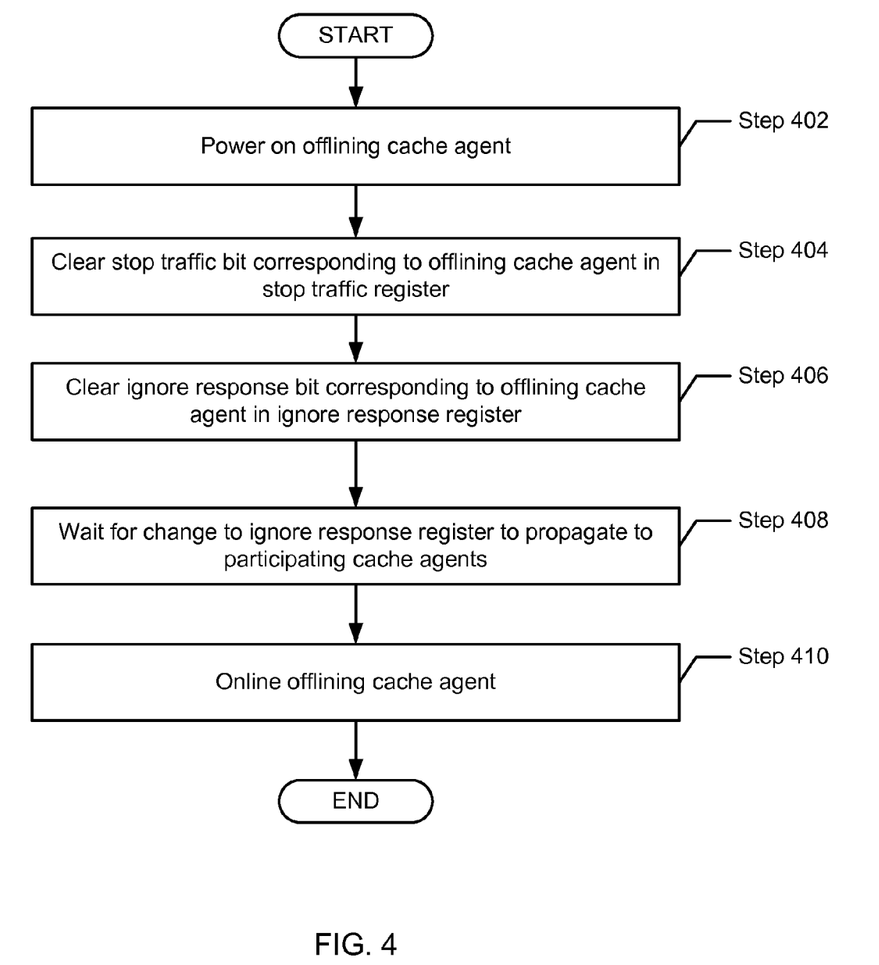
Figure 5A:
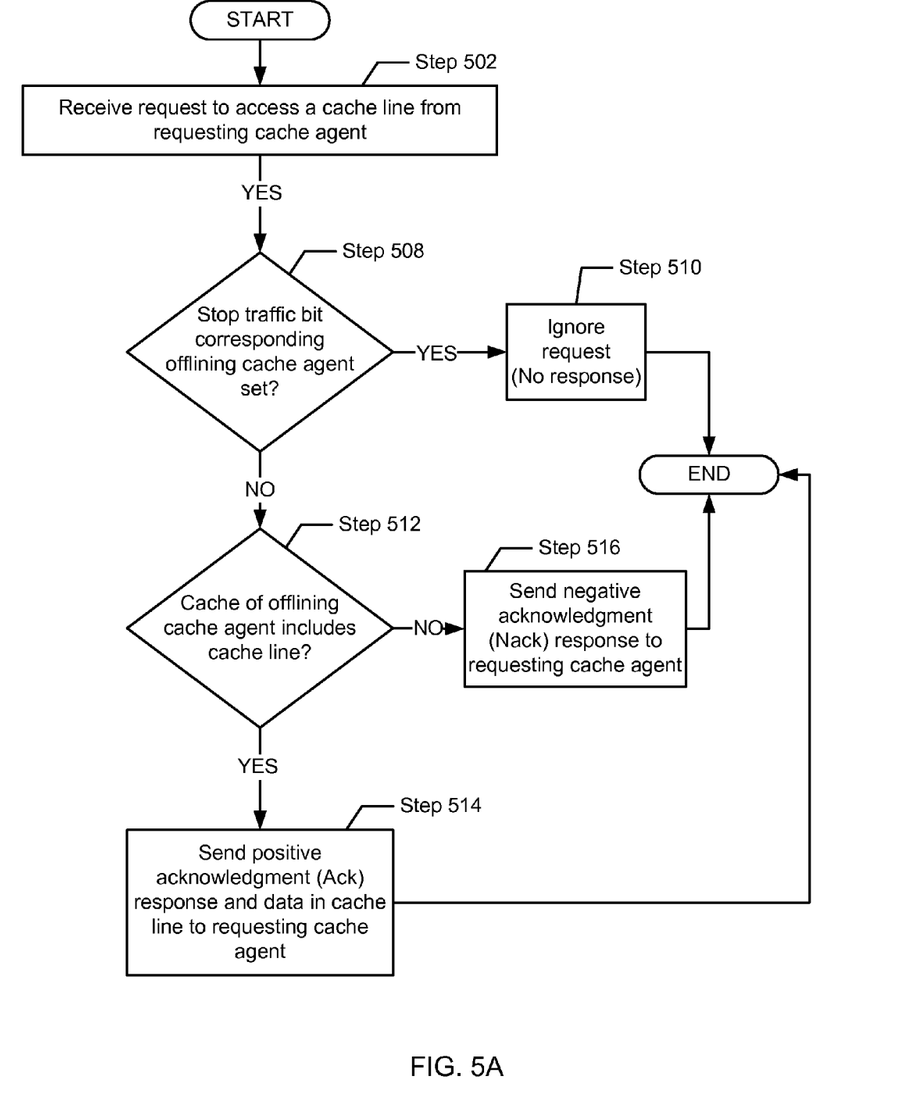
Figure 5B:
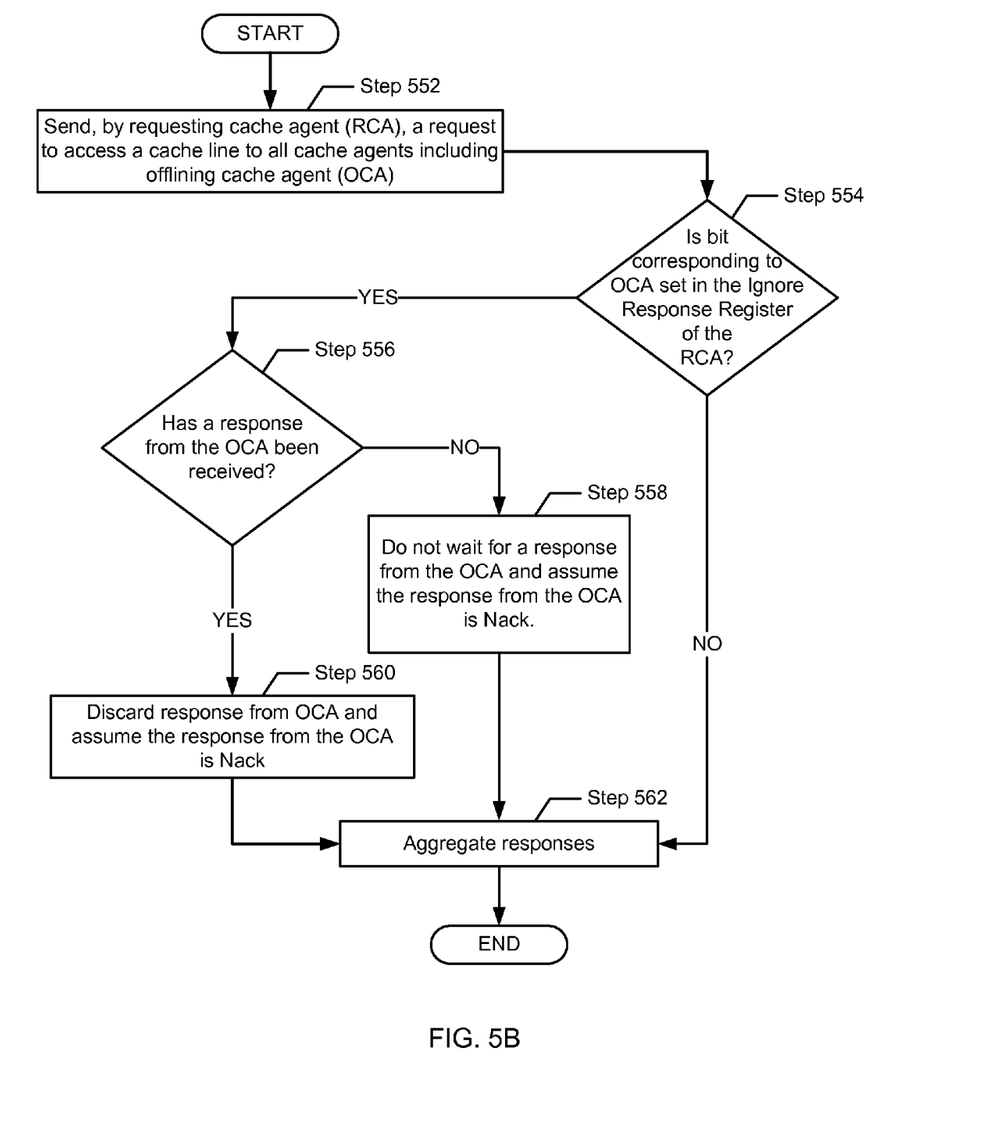

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for removal of an offlining cache agent from a system in accordance with one or more embodiments of the invention. In one or more embodiments of the invention, offlining a cache agent is placing the cache agent in a condition such that the cache agent no longer performs functionality as part of (e.g., removed or isolated from) a system. Said another way, a cache agent that has been offlined no longer operates as a part of the overall system in which the cache agent exists. In one or more embodiments of the invention, before a cache agent may be offlined, one or more additional steps are taken. In one or more embodiments of the invention, the additional steps (e.g., at least one or more of Steps 302-316, described below) along with the actual step of taking a cache agent offline (e.g., Step 318, described below) are referred to herein as removal.

In Step 302, offlining of an offlining cache agent is initiated in accordance with one or more embodiments of the invention. In one or more embodiments of the invention, an offlining cache agent is one of the cache agents in the system that is set for removal from the system. In one or more embodiments of the invention, setting the offlining cache agent for removal may be automatic or initiated by a user (e.g., hardware engineer, system administrator, hardware developer).

For example, consider the scenario in which a system includes 32 cache agents on a chip, which are not all executing to complete capacity. In order to manage power consumption, one or more cache agents may be selected to be offlining cache agents. In this example, a user may select the offlining cache agents based on power management requirements and/or work load requirements of the 32 cache agents. Additionally or alternatively, the processor executing an algorithm may detects work load of the chip and select cache agents that are not currently required (e.g., idle) to be offlining cache agents. As another example, a cache agent may require maintenance. In this example, the cache agent may be selected as an offlining cache agent based on determining that the offlining cache agent is not functioning properly.

In Step 304, the offlining cache agent is prevented from generating a request in accordance with one or more embodiments of the invention. In one or more embodiments of the invention, a request includes a memory address for a cache line. In the case of any cache agents in the system that are not the offlining cache agent (hereinafter "participating cache agents"), a request is sent to each participating cache agent in the system and the offlining cache agent to determine which cache agent if any has the cache line present. As described above in FIG. 1, the protocol requires each cache agent in the system to respond to any request issued by a participating cache agent (hereinafter "requesting cache agent").

Continuing with Step 304, in one or more embodiments of the invention, preventing the offlining cache agent from generating a request may correspond to modifying hardware states (e.g., registers) of the cache controller (e.g., core, DMA controller) associated with the offlining cache agent. The hardware states may correspond to software threads that control generation of requests. By modifying the hardware states, the software threads to generate requests may be suspended in accordance with one or more embodiments of the invention. For example, strands which may represent the hardware states in a core of the offlining cache agent may be parked such that the strands no longer generate requests.

In Step 306, any traffic to the offlining cache agent is re-routed to participating cache agents in accordance with one or more embodiments of the invention. For example, traffic may correspond to interrupts or allocating DMA write requests to external devices. In one or more embodiments of the invention, the traffic is re-routed to any participating cache agent in the system. Alternatively or additionally, the traffic may be re-routed to a participating cache agent that is processing fewer instructions than another participating cache agent. Other re-routing schemes may be used without departing from the invention.

In Step 308, cache lines owned by the offlining cache agent are flushed to memory in accordance with one or more embodiments of the invention. In one or more embodiments of the invention, flushing cache lines to memory may correspond to copying any cache lines in a cache associated with the offlining cache agent to memory. In one or more embodiments of the invention, only modified cache lines are copied to memory. Once a cache line is flushed, the entry in the cache corresponding to the cache line is empty in accordance with one or more embodiments of the invention.

In Step 310, a determination is made about whether flushing of cache lines to memory is complete in accordance with one or more embodiments of the invention. In one or more embodiments of the invention, flushing of the cache lines to memory is complete once all the entries in the cache are empty, null, or free. If a determination is made that flushing the cache lines is complete, the method may proceed to Step 312; otherwise the method may return to Step 308.

In Step 312, an ignore response indicator corresponding to the offlining cache agent is set in an ignore response register in accordance with one or more embodiments of the invention. As described above in FIG. 2, each ignore response indicator in the ignore response register for the offlining cache agent describes whether responses from a cache agent should be ignored. In one or more embodiments of the invention, an ignore response indicator corresponding to the offlining cache agent is set to represent that responses from the offlining cache agent should be ignored. However, in one or more embodiments of the invention, since each cache agent has an ignore response register, setting the ignore response indicator corresponding to the offlining cache agent is local to the offlining cache agent. Setting the ignore response indicator corresponding to the offlining cache agent is safe because any cache(s) corresponding to the offlining cache agent has already been flushed in accordance with one or more embodiments of the invention.

In Step 314, the change to the ignore response register is propagated to the participating cache agents in accordance with one or more embodiments of the invention. In one or more embodiments of the invention, each participating cache agent is notified that the ignore response indicator corresponding to the offlining cache agent should be set to represent that the participating cache agents should ignore responses from the offlining cache agent. Each participating cache agent may then update the local copy of the ignore response register to reflect the change to the ignore response indicator corresponding to the offlining cache agent. In one or more embodiments of the invention, the participating cache agents may be notified of the change to the ignore response indicator corresponding to the offlining cache agent by, for example, updating a global copy of the ignore response register that each of the participating cache agents may access. Although FIG. 3 shows Steps 312 and 314 as separate steps, Steps 312 and 314 may be combined into a single step or performed using other techniques.

In Step 316, a stop traffic indicator corresponding to the offlining cache agent is set in a stop traffic register in accordance with one or more embodiments of the invention. As described above in FIG. 2, in one or more embodiments of the invention, the stop traffic indicator describes whether any requests may be received by the offlining cache agent. Setting the stop traffic indicator prevents any requests from being processed by the offlining cache agent thereby idling the interface of the offlining cache agent. In one or more embodiments of the invention, no response is generated by the offlining cache agent because the request is not received by the offlining cache agent.

In Step 318, the offlining cache agent is brought offline in accordance with one or more embodiments of the invention. In one or more embodiments of the invention, bringing the offlining cache agent offline may correspond to removing clocks, power, etc. In other words, the offlining cache agent is no longer part of the system and is not accessible to the participating cache agents.

FIG. 4 shows a flowchart for bringing the offlining cache agent back online after removal of the offlining in FIG. 3 in accordance with one or more embodiments of the invention. In one or more embodiments of the invention, FIG. 4 is optional. For example, the offlining cache agent removed in FIG. 3 may be defective. Bringing the offlining cache agent back online in this case is not needed.

In Step 402, an offlining cache agent is powered on in accordance with one or more embodiments of the invention. In one or more embodiments of the invention, powering on the offlining cache agent may correspond to adding clocks and power and/or initializing any states to the cache controller associated with the offlining cache agent. Although the offlining cache agent is not currently accessible to the participating cache agents in the system, the offlining cache agent may be re-entered into the system in accordance with one or more embodiments of the invention.

In Step 404, a stop traffic indicator corresponding to the offlining cache agent is cleared in a stop traffic register in accordance with one or more embodiments of the invention. In one or more embodiments of the invention, clearing the stop traffic indicator of the offlining cache agent may correspond to resetting the stop traffic indicator in the stop traffic register to indicate to allow reception of requests by the offlining cache agent from a requesting cache agent.

In Step 406, an ignore response indicator corresponding to the offlining cache agent is cleared in an ignore response register in accordance with one or more embodiments of the invention. In one or more embodiments of the invention, clearing the ignore response indicator corresponding to the offlining cache agent may correspond to resetting the ignore response indicator corresponding to the offlining cache agent in the ignore response register to accept responses from the offlining cache agent. As described above in FIG. 2, in one or more embodiments of the invention, each participating cache agent and the offlining cache agent stores a local copy of the ignore response register and, thus, clears the ignore response indicator corresponding to the offlining cache agent.

In Step 408, the change to the ignore response register is propagated to participating cache agents occurs in accordance with one or more embodiments of the invention. In one or more embodiments of the invention, each participating cache agent is notified that the ignore response indicator corresponding to the offlining cache agent should be reset to represent that the participating cache agents should no longer ignore responses from the offlining cache agent. Each participating cache agent may then update the local copy of the ignore response register to reflect the change to the ignore response indicator corresponding to the offlining cache agent. In one or more embodiments of the invention, the participating cache agents may be notified of the change to the ignore response indicator corresponding to the offlining cache agent by, for example, updating a global copy of the ignore response register that each of the participating cache agents may access. Although FIG. 4 shows Steps 406 and 408 as separate steps, Steps 406 and 408 may be combined into a single step or performed using other techniques.

In Step 410, offlining cache agent is brought online in accordance with one or more embodiments of the invention. In one or more embodiments of the invention, bringing the offlining cache agent online may correspond to using the offlining cache agent as an active member of the system. In other words, the offlining cache agent is capable of doing useful work (e.g., respond to any requests from a requesting cache agent, store cache lines in any cache(s) associated with the offlining cache agent, etc.).

FIG. 5A shows a flowchart for responsiveness of an offlining cache agent during removal of the offlining cache agent from a system in accordance with one or more embodiments of the invention.

In Step 502, a request to access a cache line is received from a requesting cache agent in accordance with one or more embodiments of the invention. In one or more embodiments of the invention, a request includes a memory address for a cache line to determine which of the cache agents, if any, are associated with a cache that includes the cache line. In one or more embodiments of the invention, a participating cache agent is any cache agent that is in the system, excluding the offlining cache agent.

Continuing with Step 502, as described above in FIG. 1, the protocol requires each cache agent in the system to respond to any request issued by a requesting cache agent. In one or more embodiments of the invention, a requesting cache agent is a cache agent that issues a request to the remaining cache agents. The requesting cache agent may not proceed until the requesting cache agent receives a response from each of the cache agents in the system unless otherwise specified (described below).

In Step 508, a determination is made about whether a stop traffic indicator corresponding to the offlining cache agent is set in accordance with one or more embodiments of the invention. If a determination is made that the stop traffic indicator corresponding to the offlining cache agent is set, the method may proceed to Step 510; otherwise the method may proceed to Step 516.

In Step 510, the request is ignored by the offlining cache agent in accordance with one or more embodiments of the invention. In one or more embodiments of the invention, at this point, the request does not get processed by the offlining cache agent because the stop traffic indicator in the stop traffic register is set in Step 508. Because the request is ignored by the offlining cache agent, no response is generated by the offlining cache agent.

In Step 512, a determination is made about whether a cache of the offlining cache agent includes the cache line in accordance with one or more embodiments of the invention. In one or more embodiments of the invention, the offlining cache agent includes the cache line if the cache line is present in any caches associated with the offlining cache agent. If a determination is made that the cache of the offlining cache agent includes the cache line, the method may proceed to Step 514; otherwise the method may proceed to Step 516.

In Step 514, a positive acknowledgment (Ack) response and data in the cache line is sent to the requesting cache agent in accordance with one or more embodiments of the invention. In one or more embodiments of the invention, the Ack response signifies that the cache line is present in a cache associated with the offlining cache agent. Since the cache line is present, the data in the cache line is also sent to the requesting cache agent. In one or more embodiments of the invention, flushing cache lines of any caches associated with the offlining cache agent may not have started or completed if the cache line is present in a cache associated with the offlining cache agent.

In Step 516, a negative acknowledgment (Nack) response is sent to the requesting cache agent in accordance with one or more embodiments of the invention. In one or more embodiments of the invention, the Nack response signifies that the cache line is not present in a cache associated with the offlining cache agent.

FIG. 5B shows a flowchart for a requesting cache agent during removal of the offlining cache agent from a system in accordance with one or more embodiments of the invention.

Initially, the requesting cache agent sends a request to access a cache line (Step 552). The request includes a memory address for the cache line. Moreover, the request is sent to all cache agents in the system including the offlining cache agent and the participating cache agents. For example, the request may be placed on the request network (180) connecting all of the cache agents.

In Step 554, it is determined whether the bit corresponding to the offlining cache agent is set in the ignore response register of the requesting cache agent. As discussed above, during the removal of the offlining cache agent, the bit corresponding to the offlining cache agent is set in the ignore response register of the offlining cache agent. This new/updated value of the ignore response register is eventually propagated to all other cache agents in the system including the requesting cache agent. Accordingly, all cache agents in the system keep a local copy of the ignore response register. When it is determined that the bit corresponding to the offlining cache agent is set in the ignore response register of the requesting cache agent, the process proceeds to Step 556. When it is determined that the bit corresponding to the offlining cache agent is not set in the ignore response register of the requesting cache agent, the process proceeds to Step 562. Although Step 554 explicitly discloses "bit," those skilled in the art, having the benefit of this detailed description, will appreciate that other types of ignore request indicators may be set in the ignore request register.

In Step 556, it is determined whether the requesting cache agent has received a response (to the request of Step 552) from the offlining cache agent. If no response from the offlining cache agent has been received, the requesting cache agent does not wait for a response from the offlining cache agent. Instead, the requesting cache assumes the response from the offlining cache agent is a Nack (Step 558). However, if a response from the offlining cache agent has been received, the requesting cache agent discards the response and replaces the response from the offlining cache agent with a Nack (Step 560).

In Step 562, the aggregation logic of the requesting cache agent aggregates all of the responses received from the participating caches plus the actual response from the offlining cache (if Step 554 is false) or a Nack (if Step 554 is true). Depending on the result of the aggregation, the requesting cache agent may need to obtain the requested cache line from memory.

Figure 6A:
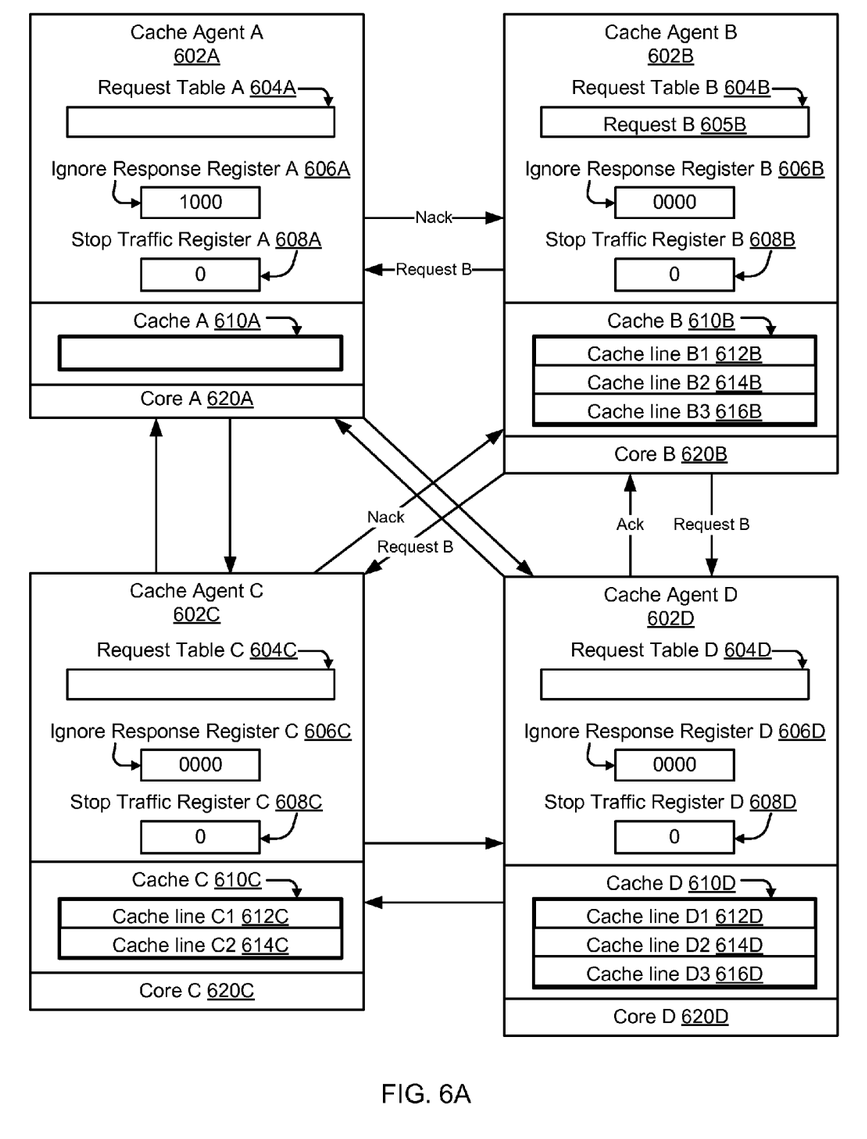
FIGS. 6A and 6B show an example in accordance with one or more embodiments of the invention.
Figure 6B:
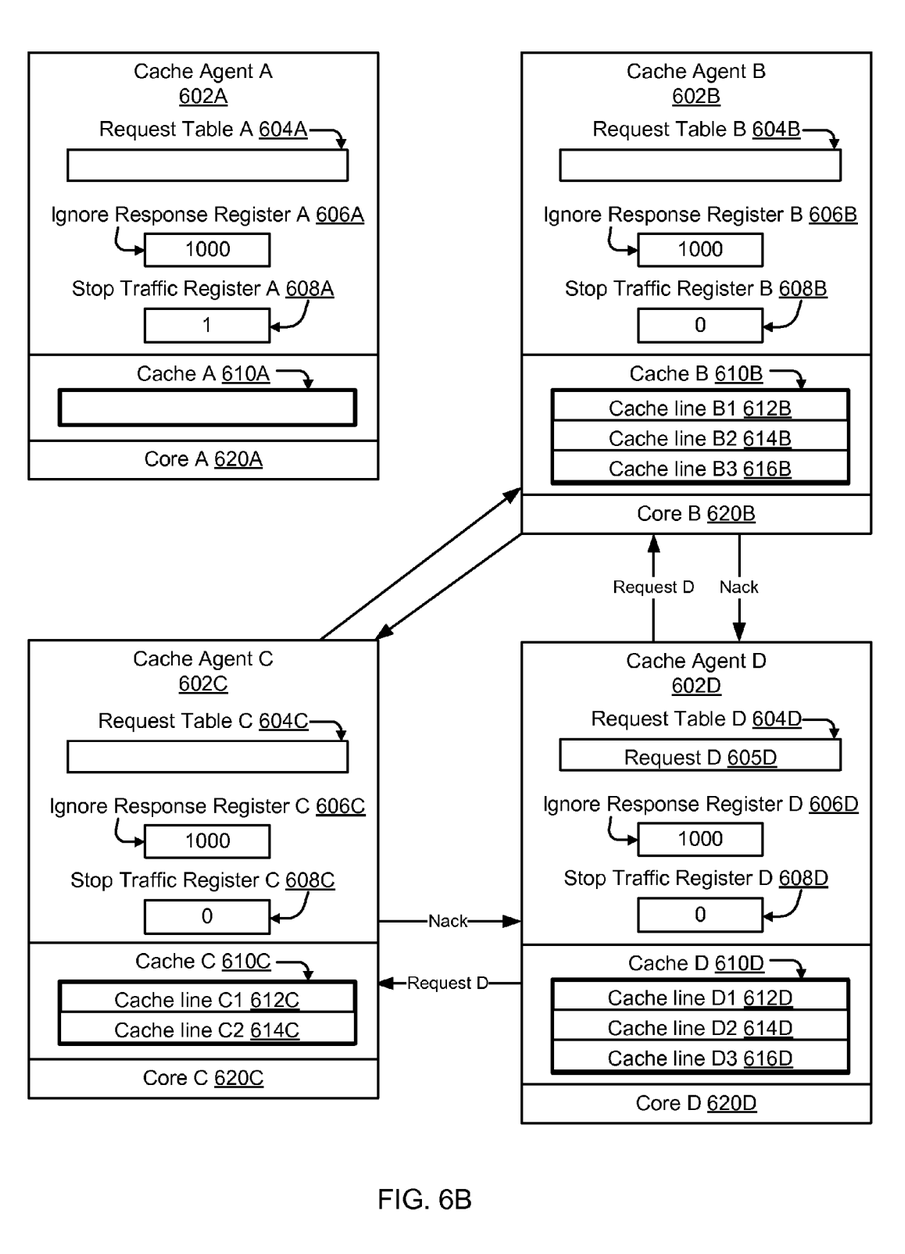

FIGS. 6A and 6B show an example in accordance with one or more embodiments of the invention. The following example is for explanatory purposes only and not intended to limit the scope of the invention.

FIGS. 6A and 6B show interactions between cache agents in a system (i.e., participating cache agents) during removal of a cache agent (i.e., offlining cache agent) from the system while transactions are in progress. Consider a scenario in which four cache agents (i.e., cache agent A (602A), cache agent B (602B), cache agent C (602C), and cache agent D (602D)) are on a processor and part of the system. The protocol dictates that each cache agent replies to any request issued by any of the cache agents.

Cache agent A (602A) is associated with cache A (610A) and core A (620A); cache agent B (602B) is associated with cache B (610B) and core B (620B); cache agent C (602C) is associated with cache C (610C) and core C (620C); and cache agent D (602D) is associated with cache D (610D) and core D (620D).

Cache A (610A) includes no cache lines; cache B (610B) includes cache line B1 (612B), cache line B2 (614B), and cache line B3 (616B); cache C (610 C) includes cache line C1 (612C) and cache line C2 (614C); and cache D (610D) includes cache line D1 (612D), cache line D2 (614D), and cache line D3 (616D).

Turning to FIG. 6A, the processor detects that core A (620A) associated with cache agent A (602A) is not needed for the current work load of the processor. To save power on the processor, the processor initiates offlining of cache agent A (602A) and removal of cache agent A from the system. Request B (605B) is re-routed from cache agent A (602A) to cache agent B (602B). Thus, request table A (604A) that includes any requests to send to the cache agents in the system (i.e., 602B-602D) is empty. Request table C (604C) of cache agent C (602C) and request table D (604D) of cache agent D are also currently empty.

Cache lines in cache A (610A) associated with cache agent A (602A) are flushed to memory, consequently, cache A does not include any cache lines. Since cache A (610A) is empty, ignore response register A (606A) is set from 0000 to 1000. The left most ignore response bit of 1 corresponds to cache agent A (602A). The remaining bits correspond to cache agent B (602B), cache agent C (602C), and cache agent D (602D).

Although ignore response register A (606A) reflects the change to the ignore response bit corresponding to cache agent A (602A), ignore response register B (606B) of cache agent B (602B), ignore response register C (606C) of cache agent C (602C), and ignore response register D (606D) of cache agent D (602D) are all set to 0000. The change to the ignore response bit corresponding to cache agent A (602A) has not yet propagated to the other cache agents (i.e., 602B-602D). Since the change has not yet propagated, stop traffic register A (608A) remains set to 0. Therefore, cache agent A (602A) may still receive requests and generate responses. Stop traffic register B (608B) of cache agent B (602B), stop traffic register C (608C) of cache agent C (602C), and stop traffic register D (608D) of cache agent D (602D) are also set to 0.

Continuing with the example in FIG. 6A, request B (605B) in request table B (604B) is sent by cache agent B (602B) (i.e., requesting cache agent) to cache agent A (602A), cache agent C (602C), and cache agent D (602D). Request B (605B) is a request for data in cache line D2 (614D). Cache agent B (602B) requires a response from each of the other cache agents (i.e., 602A, 602C-602D). Since cache A (610A) of cache agent A (602A) is empty, cache agent A responds to request B (605B) with a Nack. Cache C (610C) of cache agent C (602C) does not include cache line D2 (614D) requested in request B (605B). Therefore, cache agent C responds to request B (605B) with a Nack. Cache D (610D) of cache agent D (602D) includes cache line D2 (614D) requested in request B (605B). An Ack and data in cache line D2 (614D) are sent to cache agent B (602B). Each of the cache agents (i.e. 602A, 602C-602D) responded to request B (605B) thereby satisfying the requirement of the protocol.

Turning to FIG. 6B, FIG. 6B corresponds to the four cache agents (602A-602D) in FIG. 6A at later time point in the removal of cache agent A (602A) than FIG. 6A.

The ignore response bit corresponding to cache agent A (602A) (i.e., left-most bit in ignore response register A (608A) has propagated to ignore response register B (606B) of cache agent B (602B), ignore response register C (606C) of cache agent C (602C), and ignore response register D (606D) of cache agent D (602D). At this point, any request received by cache agent A (602A) is responded to with a Nack response. However, the requesting cache agent (602B-602D) does not wait for any response or ignores any response.

Continuing with the example in FIG. 6B, after propagation of the ignore response bit corresponding to cache agent A (602A), the stop traffic bit in stop traffic register A (608A) is set to 1 representing that cache agent A will not process any received request. Therefore, no response is generated.

Request table A (604A) of cache agent A (602A) and request table C (604C) of cache agent C (602C) remain empty. Request table B (604B) is now empty because request B (605B) was completed in FIG. 6A. Request table D (604D) includes request D (605D) requesting data in cache line C3 (not shown). Request D (605D) is sent to cache agent A (602A) (not shown), cache agent B (602B), and cache agent C (602C). As described above, cache agent A (602A) does not receive request D (605D) as stop traffic register A (608A) is set to prevent any reception of request D. Cache B (610B) of cache agent B (602B) and cache C (610C) of cache agent C (602C) do not include cache line C3 requested in request D (605D). Therefore, cache agent B (602B) and cache agent C (602C) both respond to request D (605D) with a Nack. Since ignore response register D (606D) knows from ignore response register D (606D) to ignore and not wait for a response from cache agent A (602A), functioning of coherency in the system is not disturbed or affected. Cache agent D (602D) retrieves cache line C3 from memory since cache agents that are responsive (i.e., 602B and 602C) included cache line C3.

Figure 7:
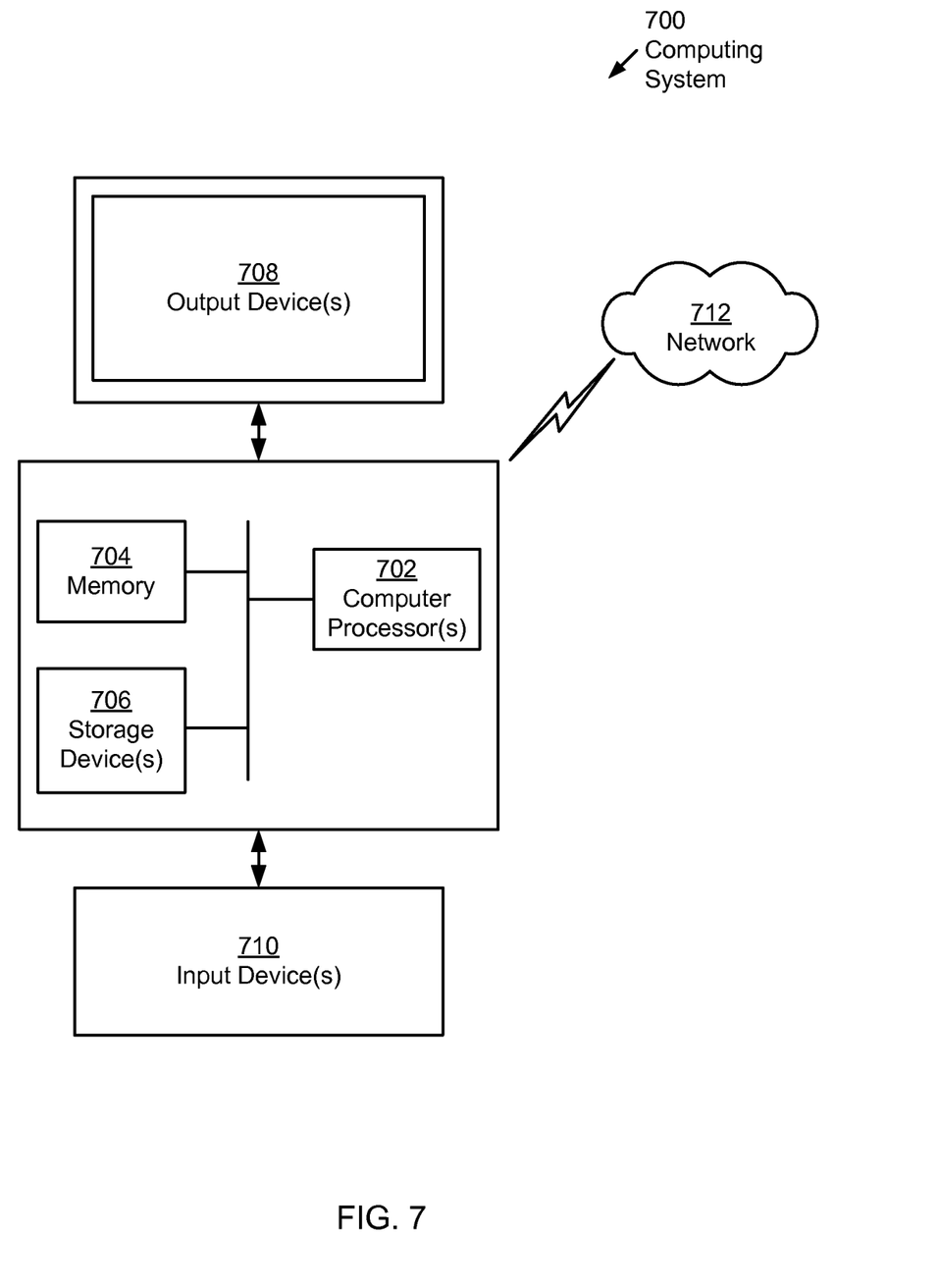
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, firmware or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Embodiments of the invention enable removal of an offlining cache agent from a system. Specifically, embodiments of the invention enable removal of the offlining cache agent while transactions are in progress between the offlining cache agent and participating cache agents in a system. Embodiments of the invention enable the offlining cache agent to respond or ignore requests from any requesting cache agent while the offlining cache agent is being removed without disrupting the coherency between the remaining participating cache agents.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for removal of an offlining cache agent, comprising:
    initiating an offlining of the offlining cache agent from communicating with a plurality of participating cache agents while a first transaction is in progress;
    setting, based on initiating the offlining, an ignore response indicator corresponding to the offlining cache agent on each of the plurality of participating cache agents;
    offlining, based on setting the ignore response indicator, the offlining cache agent; and
    ignoring, based on setting the ignore response indicator, a first response to the transaction from the offlining cache agent.

2. The method of claim 1, further comprising:
    setting, prior to offlining and after setting the ignore response indicator, a stop traffic indicator corresponding to the offlining cache agent; and
    ignoring, by the offlining cache agent and based on setting the stop traffic indicator, a second transaction to the offlining cache agent.

3. The method of claim 1, further comprising:
    stopping, based on initiating the offlining, the offlining cache agent from generating a request; and
    re-routing, based on initiating the offlining, a second transaction to the plurality of participating cache agents.

4. The method of claim 1, further comprising:
powering, after offlining the offlining cache agent, the offlining cache agent;
clearing a stop traffic indicator corresponding to the offlining cache agent;
sending, based on clearing the stop traffic indicator, a second transaction to the offlining cache agent;
clearing the ignore response indicator corresponding to the offlining cache agent;
sending, based on clearing the ignore response indicator, a second response to the second transaction;
propagating clearing the ignore response indicator to the plurality of participating cache agents; and
onlining, based on propagating clearing the ignore response indicator, the offlining cache agent.

5. The method of claim 1, wherein the first transaction comprises a request to the offlining cache agent and the first response to the request from the offlining cache agent.

6. The method of claim 1, wherein the plurality of participating cache agents and the offlining cache agent complies with a snoopy cache coherence protocol, and wherein the snoopy cache coherence protocol directs each participating cache agent of the plurality of participating cache agents to respond to the first transaction.

7. A non-transitory computer-readable storage medium storing a plurality of instructions for removal of an offlining cache agent, the plurality of instructions comprising functionality to:
initiate an offlining of the offlining cache agent from communicating with a plurality of participating cache agents while a first transaction is in progress;
set, based on initiating the offlining, an ignore response indicator corresponding to the offlining cache agent on each of the plurality of participating cache agents;
offline, based on setting the ignore response indicator, the offlining cache agent; and
ignore, based on propagating setting the ignore response indicator, a first response to the transaction from the offlining cache agent.

8. The non-transitory computer-readable storage medium of claim 7, further comprising functionality to:
set, prior to offlining and after setting the ignore response indicator, a stop traffic indicator corresponding to the offlining cache agent; and
ignore, by the offlining cache agent and based on setting the stop traffic indicator, a second transaction to the offlining cache agent.

9. The non-transitory computer-readable storage medium of claim 7, further comprising functionality to:
stop, based on initiating the offlining, the offlining cache agent from generating a request; and
re-route, based on initiating the offlining, a second transaction to the plurality of participating cache agents.

10. The non-transitory computer-readable storage medium of claim 7, further comprising functionality to:
power, after offlining the offlining cache agent, the offlining cache agent;
clear a stop traffic indicator corresponding to the offlining cache agent;
send, based on clearing the stop traffic indicator, a second transaction to the offlining cache agent;
clear the ignore response indicator corresponding to the offlining cache agent;
send, based on clearing the ignore response indicator, a second response to the second transaction;
propagate clearing the ignore response indicator to the plurality of participating cache agents; and
online, based on propagating clearing the ignore response indicator, the offlining cache agent.

11. The non-transitory computer-readable storage medium of claim 7, wherein the first transaction comprises a request to the offlining cache agent and the first response to the request from the offlining cache agent.

12. The non-transitory computer-readable storage medium of claim 7, wherein the plurality of participating cache agents and the offlining cache agent complies with a snoopy cache coherence protocol, and wherein the snoopy cache coherence protocol directs each participating cache agent of the plurality of participating cache agents to respond to the first transaction.

13. A system, comprising:
a plurality of cache for storing a plurality of cache lines, and
a plurality of cache agents comprising a plurality of participating cache agents and an offlining cache agent, wherein each cache of the plurality of cache corresponds to one of the plurality of cache agents, and wherein the plurality of cache agents are configured to:
initiate an offlining of the offlining cache agent from communicating with a plurality of participating cache agents while a first transaction is in progress, wherein the first transaction is for a cache line of the plurality of cache lines,
set, based on initiating the offlining, an ignore response indicator corresponding to the offlining cache agent on each of the plurality of participating cache agents,
offline, based on setting the ignore response indicator, the offlining cache agent, and
ignore, based on setting the ignore response indicator, a first response to the transaction from the offlining cache agent.

14. The system of claim 13, wherein each of the plurality of participating cache agents comprises an ignore response register for storing the ignore response indicator.

15. The system of claim 13, wherein the offlining cache agent comprises a stop traffic register for storing a stop traffic indicator.

16. The system of claim 13, wherein the plurality of participating cache agents and the offlining cache agents each have a corresponding processing core for processing instructions.

17. The system of claim 13, wherein the plurality of participating cache agents and the offlining cache agents each is a processing core for processing instructions.

18. The system of claim 13, wherein the plurality of participating cache agents and the offlining cache agents each have a corresponding cache comprising a plurality of entries for storing a plurality of cache lines.

19. The system of claim 13, wherein at least one of the plurality of participating cache agents corresponds to a direct memory access cache.

20. The system of claim 13, wherein the plurality of cache and the plurality of participating cache agents are located on a processor.

* * * * *

UNITED STATES PATENT AND TRADEMARK OFFICE
CERTIFICATE OF CORRECTION

PATENT NO. : 9,460,013 B2  
APPLICATION NO. : 14/479191  
DATED : October 4, 2016  
INVENTOR(S) : Smentek et al.

Page 1 of 1

It is certified that error appears in the above-identified patent and that said Letters Patent is hereby corrected as shown below:

In the Claims

In Column 3, Line 34, delete "(122D)))" and insert -- (122D)) --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*